(12) United States Patent
Shamasundar (10) Patent No.: US 12,122,531 B2
(45) Date of Patent: Oct. 22, 2024

(54) SYSTEMS AND METHODS FOR TRANSCRIBING AND ANALYZING BROADCAST MESSAGES IN AN AIRCRAFT

(71) Applicant: HONEYWELL INTERNATIONAL INC., Charlotte, NC (US)

(72) Inventor: Raghu Shamasundar, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 359 days.

(21) Appl. No.: 17/505,247

(22) Filed: Oct. 19, 2021

(65) Prior Publication Data

US 2023/0074014 A1  Mar. 9, 2023

(30) Foreign Application Priority Data

Sep. 6, 2021 (IN) .............................. 202111040372

(51) Int. Cl.
*B64D 45/00* (2006.01)
*G08G 5/00* (2006.01)

(52) U.S. Cl.
CPC .......... *B64D 45/00* (2013.01); *G08G 5/0004* (2013.01); *G08G 5/0039* (2013.01); *B64D 2045/0075* (2013.01)

(58) Field of Classification Search
CPC ............ B64D 45/00; B64D 2045/0075; G08G 5/0004; G08G 5/0039
See application file for complete search history.

(56) References Cited

U.S. PATENT DOCUMENTS

| 9,613,536 B1 * | 4/2017 | Wolford ............... G08G 5/0026 |
| 10,515,554 B1 * | 12/2019 | Shamasundar ...... G01C 23/005 |
| 10,798,189 B1 * | 10/2020 | Sivaratri ................. H04L 67/02 |
| 2013/0346081 A1 | 12/2013 | Loubiere et al. |
| 2015/0081292 A1 | 3/2015 | Populus et al. |
| 2015/0162001 A1 | 6/2015 | Kar et al. |
| 2016/0202950 A1 | 7/2016 | Hawley |
| 2016/0284220 A1 | 9/2016 | Kar et al. |
| 2016/0379640 A1 | 12/2016 | Joshi et al. |
| 2018/0129635 A1 | 5/2018 | Saptharishi et al. |
| 2018/0277116 A1 | 9/2018 | Shamasundar |

(Continued)

FOREIGN PATENT DOCUMENTS

| CN | 110335609 A | 10/2019 |
| EP | 3474256 A1 | 4/2019 |
| EP | 3534353 A1 | 9/2019 |

*Primary Examiner* — Peter D Nolan
*Assistant Examiner* — Wae L Louie
(74) *Attorney, Agent, or Firm* — Lorenz & Kopf LLP (57) ABSTRACT

Methods and systems provide a visual user interface on a display device associated with an aircraft. A Flight Information System (FIS) broadcast report; and an Air Traffic Control (ATC) broadcast message are received. The FIS broadcast report and the ATC broadcast message are transcribed. Ownship data for the aircraft is received. The ownship data concerns at least one of: a state of the aircraft, a flight plan for the aircraft and a state of components of the aircraft. The transcribed FIS broadcast report is analyzed with respect to the ownship data to determine filtered FIS information that is relevant to the ownship. A visual user interface (UI) is rendered to be displayed on the display device. The visual UI includes the transcribed ATC broadcast message and the filtered FIS information.

18 Claims, 7 Drawing Sheets

(56) References Cited

U.S. PATENT DOCUMENTS

| | | | |
|---|---|---|---|
| 2020/0090351 A1 | 3/2020 | Baladhandapani et al. | |
| 2021/0020168 A1* | 1/2021 | Dame | G08G 5/0013 |
| 2021/0134162 A1* | 5/2021 | Sundaramurthy | G08G 5/0004 |
| 2022/0115008 A1* | 4/2022 | Pust | G10L 15/16 |
| 2022/0189316 A1* | 6/2022 | Paul | G05D 1/0022 |
| 2022/0246150 A1* | 8/2022 | Pust | G08G 5/0021 |
| 2022/0343771 A1* | 10/2022 | Schwindt | G08G 5/0021 |
| 2023/0005483 A1* | 1/2023 | Garg | G08G 5/0052 |
| 2023/0074014 A1* | 3/2023 | Shamasundar | G08G 5/0091 |
| 2023/0091597 A1* | 3/2023 | Shamasundar | G08G 5/0013 |
| | | | 340/963 |
| 2023/0222925 A1* | 7/2023 | Foland | G08G 5/0013 |
| | | | 701/15 |
| 2023/0348093 A1* | 11/2023 | Moy | G08G 5/0039 |
| 2023/0350910 A1* | 11/2023 | Pakki | G08G 5/0052 |
| 2023/0392954 A1* | 12/2023 | Rao | G06F 40/279 |

* cited by examiner

SYSTEMS AND METHODS FOR TRANSCRIBING AND ANALYZING BROADCAST MESSAGES IN AN AIRCRAFT

CROSS REFERENCE TO RELATED APPLICATION

This application claims priority to India Provisional Patent Application No. 202111040372, filed Sep. 6, 2021, the entire content of which is incorporated by reference herein.

TECHNICAL FIELD

The subject matter described herein relates to the display of transcribed broadcast messages.

BACKGROUND

Broadcast messages from Air Traffic Control (ATC) can be transcribed and displayed on a pilot window of an Electronic Flight Bag application. To do so, a voice to text transcription application transcribes the broadcast messages. In particular, the transcription application provides direct translation of conversation messages between crew and a ground ATC member. Some of the messages between the ATC and the flight crew will require a modification of a current aircraft state or flight plan, which can be implemented by the pilot.

The flight crew is required to consider a variety of information sources as well as messages from ATC when deciding upon an optimal course of action, which may involve submitting a request to ATC for approval.

It is desirable to provide methods and systems that better integrate data sources and further provide intelligent support for the flight crew to make decisions based on broadcast messages including ATC messages. Furthermore, other desirable features and characteristics of the present invention will become apparent from the subsequent detailed description and the appended claims, taken in conjunction with the accompanying drawings and the foregoing technical field and background.

BRIEF SUMMARY

In one aspect, a method is provided for providing a visual user interface on a display device associated with an aircraft. The method includes: receiving, via a receiving system of an aircraft, a Flight Information System (FIS) broadcast report; receiving, via the receiving system, an Air Traffic Control (ATC) broadcast message; transcribing, using a voice to text application, the FIS broadcast report and the ATC broadcast message; receiving, via at least one processor, ownship data for the aircraft concerning at least one of: a state of the aircraft, a flight plan for the aircraft and a state of components of the aircraft; analyzing, via the at least one processor, the transcribed FIS broadcast report with respect to the ownship data or with respect to content of the transcribed ATC broadcast message to determine filtered FIS information that is relevant to the ownship; and rendering, via the at least one processor, a visual user interface (UI) to be displayed on the display device, the visual UI including the transcribed ATC broadcast message and the filtered FIS information.

In embodiments, the visual UI includes the transcribed ATC broadcast message tagged to the filtered FIS information and further includes the transcribed FIS broadcast report.

In embodiments, rendering the visual UI includes rendering a functional cue that causes, when selected, the visual UI to switch between an ATC window and an FIS window. The FIS window additionally renders the transcribed FIS broadcast report, which is not displayed in the ATC window.

In embodiments, the display device is an Electronic Flight Bag (EFB) display device.

In embodiments, the method includes determining advisory data describing advice to alleviate an adverse condition included in the filtered FIS information. An advisory message is rendered based on the advisory data as part of the visual UI including the transcribed ATC broadcast message and the filtered FIS information.

In embodiments, the filtered FIS information includes weather conditions along the flight plan.

In embodiments, the method includes determining advisory data describing advice to alleviate an adverse weather condition included in the filtered FIS information, wherein an advisory message based on the advisory data is rendered as part of the visual UI including the transcribed ATC broadcast message and the filtered FIS information.

In embodiments, the method includes analyzing alternative flight path options with respect to the transcribed FIS information in determining the advisory data.

In embodiments, the advisory message includes a prompt to submit a request to ATC a change in the flight plan.

In embodiments, the change in the flight plan includes a change in destination runway or a change in approach path.

In another aspect, a system is provided for providing a visual user interface on a display device associated with an aircraft. The system includes: a receiving system configured to receive a Flight Information System (FIS) broadcast report and an Air Traffic Control (ATC) broadcast message; a display device; and at least one processor in operable communication with the receiving system and the display device. The program instructions are configured to cause the at least one processor to: transcribe, using a voice to text application, the FIS broadcast report and the ATC broadcast message; receive ownship data for the aircraft concerning at least one of: a state of the aircraft, a flight plan for the aircraft and a state of components of the aircraft; analyze the transcribed FIS broadcast report with respect to the ownship data or with respect to content of the transcribed ATC broadcast message to determine filtered FIS information that is relevant to the ownship; and render a visual user interface (UI) to be displayed on the display, the visual UI including the transcribed ATC broadcast message and the filtered FIS information.

In embodiments, the visual UI includes the transcribed ATC broadcast message tagged to the filtered FIS information and further includes the transcribed FIS broadcast report.

In embodiments, rendering the visual UI includes rendering a functional cue that causes, when selected, the visual UI to switch between an ATC window and an FIS window, wherein the FIS window additionally renders the transcribed FIS broadcast report, which is not displayed in the ATC window.

In embodiments, the display device is an Electronic Flight Bag (EFB) display device.

In embodiments, the processor is configured to determine advisory data describing advice to alleviate an adverse condition included in the filtered FIS information, wherein an advisory message based on the advisory data is rendered as part of the visual UI including the transcribed ATC broadcast message and the filtered FIS information.

In embodiments, the filtered FIS information includes weather conditions along the flight plan.

In embodiments, the processor is configured to determine advisory data describing advice to alleviate an adverse weather condition included in the filtered FIS information, wherein an advisory message based on the advisory data is rendered as part of the visual UI including the transcribed ATC broadcast message and the filtered FIS information.

In embodiments, the at least one processor is configured to analyze alternative flight path options with respect to the transcribed FIS information in determining the advisory data.

In embodiments, the advisory message includes a prompt to submit a request to ATC a change in the flight plan.

In embodiments, the change in the flight plan includes a change in destination runway or a change in approach path.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Systems and methods described herein provide transcription and analysis of broadcast communications. The systems and methods include an analyzer which interprets text messages provided by a voice to text transcription application and analyzes an impact of the content of the text messages on an active flight route. The systems and methods provide visual advisories tagged to displayed messages to support flight crew in negotiating with ATC operators. Accordingly, the systems and methods of the present disclosure are able to analyze Flight information Service (FIS) messages and provide a visual advisory indicating a recommended ATC request message based on aircraft state and projected trajectory changes. The systems and methods increase overall situational awareness in the cockpit and also help the crew to understand FIS and ATC messages.

The present systems and methods analyze FIS messages that have been converted from voice to text by a transcription application. An ATC request advisory can be rendered and tagged to FIS messages. The ATC request tags are built to support negotiation with an ATC center when FIS messages have an impact on the ownship flight route trajectory.

According to the present disclosure, an analyzer filters an incoming FIS report to provide for relevance to ownship data. The filtered FIS data is further analyzed to provide ATC request tags to those filtered messages which impact the current flight plan. The ATC requests tags include an advisory predicting what action may optimally be taken, if any, in response to the FIS message that has been deemed relevant to the active flight, allowing crew to quickly ascertain what action needs to be taken with respect to ATC. Accordingly, the systems described herein can increase overall situational awareness in the cockpit and help the crew in negotiating with ATC for any flight plan change modifications.

Figure 1:
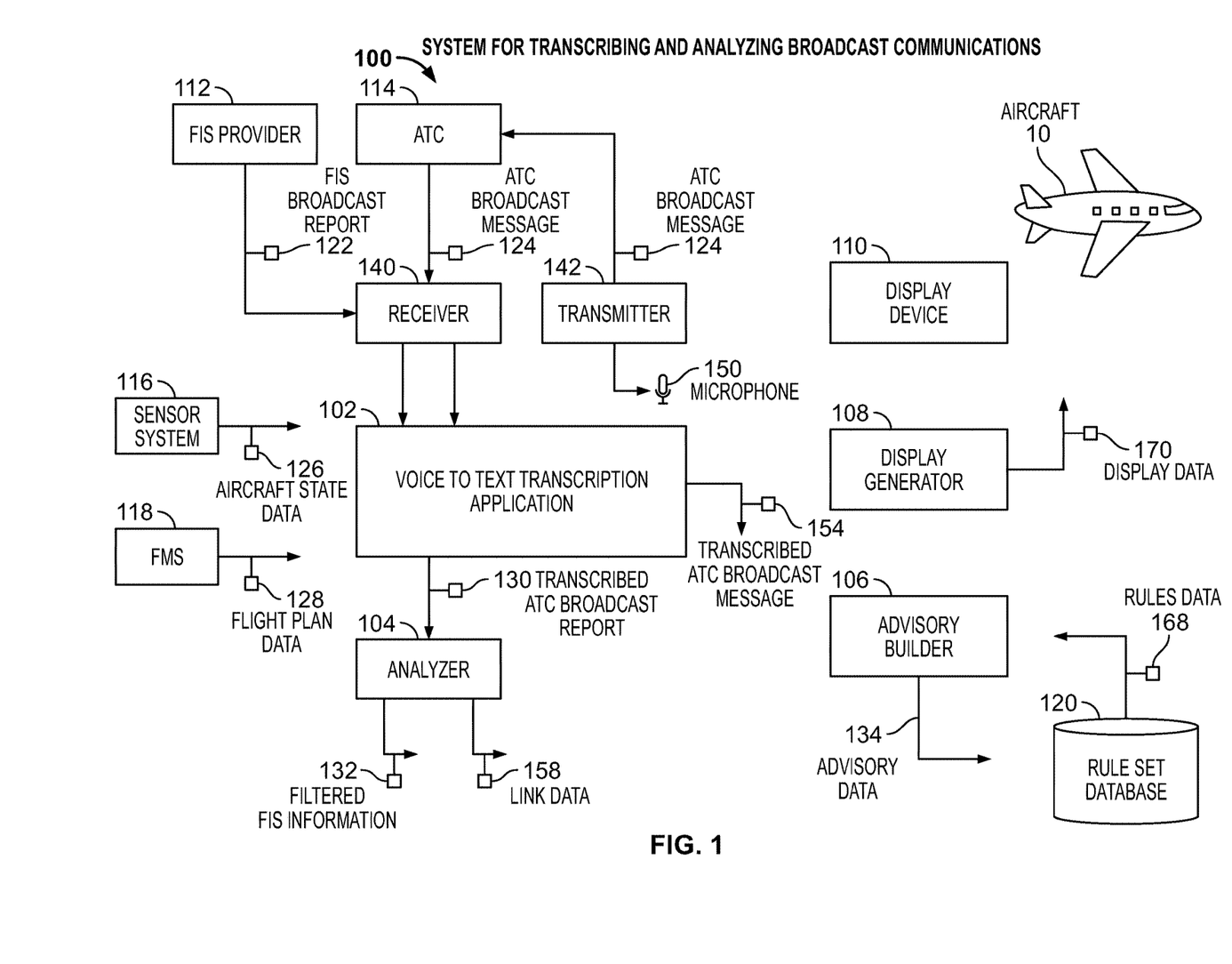
FIG. 1 is a block diagram of transcription system, in accordance with an exemplary embodiment.

FIG. 1 depicts an exemplary embodiment of a system 100 for transcribing and analyzing broadcast communications that is associated with an aircraft 10. The illustrated system 100 includes a voice to text transcription application 102 coupled to an analyzer 104 and an advisory builder 106. The voice to text transcription application receives broadcast data from an FIS provider 112 and broadcast data sent between ATC and 114 and a member of the flight crew. The system 100 further includes a display generator 108 and a display device 110 for rendering windows with transcribed messages and advisories recommending an ATC request in reaction to transcribed FIS information that is relevant to the ownship aircraft 10. The advisories are built by the advisory builder 106 based on information from a rule set database 120 included in the system 100. The system 100 further includes a sensor system 116 and a Flight Management System (FMS) 118 to provide context data for the aircraft that informs relevancy analysis by the analyzer 104.

The system 100 is implemented by a processing system 506 as described in further detail below with respect to FIG. 7. The processing system 506 executes programming instructions to analyze transcribed text from the FIS provider 112 for relevancy to the ownship aircraft 10 and to build ATC advice based on the relevant FIS information. It should be appreciated that FIG. 1 is a simplified representation of the system 100 associated with an aircraft 10 for purposes of explanation and is not intended to limit the subject matter in any way. In this regard, it will be appreciated that, in practice, the system 100 onboard the aircraft 10 may include any number of different onboard systems configured to support operation of the aircraft 10, and the subject matter described herein is not limited to any particular type or number of onboard systems.

The FIS provider 112 broadcasts FIS information in the form of FIS broadcast reports 122, which provides advice and information useful to ensure safe and efficient flight conduct. There are two types of FIS broadcast: Aerodrome FIS (AFIS) and Enroute FIS. Air Traffic Control Offices (ATCOs) provide FIS together with ATC service and air navigation service providers (ANSPs) may have dedicated units that provide Flight Information to aircraft in uncontrolled airspace, or even to flights that are controlled by an ATCO on another frequency (e.g. class E airspace/provision of weather information on the second set). Differences exist in implementation and execution of both Enroute FIS and Aerodrome FIS (AFIS) between Member States. In general, the flight information service (FIS) is intended to supplement and update flight information on weather, status of navigation aids and other pertinent matters (military exercises, airspace restrictions, etc.), which the pilot received prior to departure from the meteorological (MET) and aeronautical information service (AIS) so as to be fully aware at all times of all relevant details regarding matters influencing the safe and efficient conduct of the flight. FIS can include the provision of any of Significant Meteorological Information (SIGMET) and AIRman's METeorological Information (AIRMET), information concerning pre-eruption volcanic activity, volcanic eruptions and volcanic ash clouds, information concerning the release into the atmosphere of radioactive materials or toxic chemicals, information on changes in the availability of radio navigation services, information on changes in condition of aerodromes and associated facilities, including information on the state of the aerodrome movement areas when they are affected by snow, ice or significant depth of water, information on unmanned free balloons, and of any other information likely to affect safety.

The ATC 114 service is a service provided for the purpose of: preventing collisions between aircraft and on the maneuvering area between aircraft and obstructions; and expediting and maintaining an orderly flow of air traffic. Before take-off, the aircraft 10 submits a flight plan to ATC 114. The path of the aircraft 10 may have to be changed from the original flight plan, e.g. to move around bad weather or to avoid a congested sector. The pilot may request a change to the flight plan by submitting such a request to the ATC 114. The changes may include heading, speed and/or altitude.

The system 100 of FIG. 1 includes a receiver 140 and a transmitter 142. The receiver 140 receives FIS broadcast reports 122 and ATC broadcast messages 124 over respective voice-based radio channels of different frequencies. The transmitter 142 broadcasts ATC broadcast messages 124 over the ATC voice-based radio channel. The voice transmissions are initiated by a member of the flight crew speaking into a headset including a microphone 150. The received ATC broadcast messages may be heard by a member of the flight crew through speakers (not shown) of the headset. The ATC broadcast messages 124 (which include both received and transmitted ATC broadcast messages 124 by/from the aircraft 10) can be passed to the voice to text transcription application 102 for conversion from a voice format to a text format. Similarly, the FIS broadcast reports 122 can be passed to the voice to text transcription application 102 for conversion from a voice format to a text format. The voice to text transcription application 102 can use any suitable technique for performing conversion from voice to text. The voice to text transcription application 102 may use artificial intelligence (e.g. a recurrent neural network) that transcribes analog or digital aviation audio into text in near-real time. The artificial intelligence application is trained with an aviation specific dataset allowing the voice to text transcription application 102 to perform better than general natural language processing applications, which can provide inaccurate transcriptions due to cadence, noise, and vocabulary of the aviation industry.

The voice to text transcription application 102 outputs transcribed FIS broadcast reports 130 and transcribed ATC broadcast messages 154 that are provided to the display generator 108 for display on the display device 110. The transcribed FIS broadcast reports are provided to the analyzer 104 for analysis with respect to relevancy to the ownship aircraft 10. In embodiments, the analyzer 104 receives aircraft state data 126 from the sensor system 116 and flight plan data 128 from a Flight Management System (FMS) 118. The aircraft state data 126 can include airspeed, heading, location in three dimensions, information from avionics Line Replaceable unit (LRUs) of the aircraft 10, etc. The aircraft location information may be provided via the FMS 118 as well. The FMS 118 provides the flight plan data 128, which includes four dimensions of data (three-dimension of space and one dimension of time) concerning the planned flight path from the current aircraft location to the destination. These are just some examples of data concerning the ownship aircraft 10 that can be provided to give context to the analyzer 104 to sort the transcribed FIS broadcast reports 130 into messages relevant to the ownship aircraft 10. The analyzer 104 thus filters out FIS information from the transcribed FIS broadcast reports 130 that is relevant to the ownship aircraft 10 based on context provided by the aircraft state data 126 and the flight plan data 128 to provide filtered FIS information 132. In examples, the analyzer 104 may compare the location of conditions (e.g. adverse conditions) included in the transcribed FIS broadcast report 130 with the location or predicted location of the aircraft 10 to filter that information as being relevant. In some embodiments, the analyzer 104 further receives the transcribed ATC broadcast message 154 so that a link can be built between that message and FIS information included in the transcribed FIS broadcast report 130. For example, clearance messages or flight plan related messages or aerodrome landing information messages included in the transcribed ATC broadcast messages 154 can be used as a basis for searching (e.g. based on positional information) the transcribed FIS broadcast reports 130 for relevant FIS information. When such information is found, then a link is established between a transcribed ATC broadcast message 154 and an associated/relevant FIS broadcast data item. The analyzer thus outputs both filtered FIS information 132 and, when that filtered FIS information 132 (or a specific data item therein) is relevant to a specific transcribed ATC broadcast message 154, link data 158 representing a conceptual link between the transcribed FIS broadcast and ATC broadcast data items is also output.

The filtered FIS information 132 is output to the advisory builder 106 and to the display generator 108. In this way, the display generator 108 can display filtered FIS information 132 to highlight the relevant information to the ownship aircraft 10 as well as displaying the transcribed ATC broadcast messages 154. Further, where relevant, a visual link cue can be displayed and linked ATC and FIS data items can be tagged to one another. The filtered FIS information 132, the transcribed ATC broadcast messages 154 and the link data 158 can be further analyzed by the advisory builder 106 to recommend courses of action to be requested to ATC 114 in response to the ATC information and relevant FIS information.

The advisory builder 106 receives rules data 168 from the rule set database 120, the filtered FIS information 132, the transcribed FIS broadcast reports 130, the link data 158 and the transcribed ATC broadcast messages 154. The advisory builder 106 uses rules defined in the rules data 168 to analyze the filtered FIS information 132, particularly any adverse conditions contained therein, to recommend a response to be taken by a member of the flight crew in the form of a request to ATC 114. The rule set database 120 may include a large set of (if X, then Y) type rules. Alternatively, the rules data 168 may be in the form of set values for a machine learning algorithm included in the advisory builder 106 that has been trained based on appropriate action to take for all manner of conditions that could be encountered. The advisory builder 106 may take into account the filtered FIS information 132 in determining a recommendation or further context may be provided to the advisory builder 106 in determining the recommendation including the transcribed FIS broadcast report 130, the transcribed ATC broadcast message 154 and the link data 158 so that the transcribed ATC broadcast message linked to the filtered FIS information 132 can be prioritized. The advisory builder 106 may, for example, output a recommendation to change a landing runway when the filtered FIS information 132 indicates an adverse condition (e.g. high wind, birds, damage, accident, ice, etc.) on the runway currently planned for landing according to the linked transcribed ATC broadcast message 154. Similarly, the advisory builder 106 may output a recommendation to change approach path when the filtered FIS information 132 indicates an adverse condition (e.g. adverse weather, birds, etc.) along the currently planned approach path according to the linked transcribed ATC broadcast message 154 (or the flight plan data 128). The advisory builder 106 outputs advisory data 134 embodying the recommendation/advice for a request to ATC 114 to be based upon.

The display generator 108 receives the filtered FIS information 132, the link data 158, the advisory data 134, the transcribed FIS broadcast reports 130 and the transcribed ATC broadcast messages 154 and generates/renders ATC control messages, FIS reports, ATC messages linked to filtered FIS messages and ATC recommendations/advice similarly tagged. Exemplary forms for the generated displays are described with reference to FIGS. 2 to 5. The generated displays may include an ATC window to display transcribed ATC messages, an FIS window to display transcribed FIS reports and to display linked ATC messages and filtered FIS messages and further to display the ATC request recommendation. A functional link may be provided between linked filtered FIS messages and ATC messages that can be selected by a user (using a user input device of any kind) to permit toggling between the ATC and FIS linked messages in their respective windows. The display generator 108 embodies visual user interfaces in the form of display data 170 that is sent to the display device 110 to output the generated display. The display device 110 may be any cockpit display device or may be an Electronic Flight Bag (EFB) display device such as a tablet display device.

Figure 2:
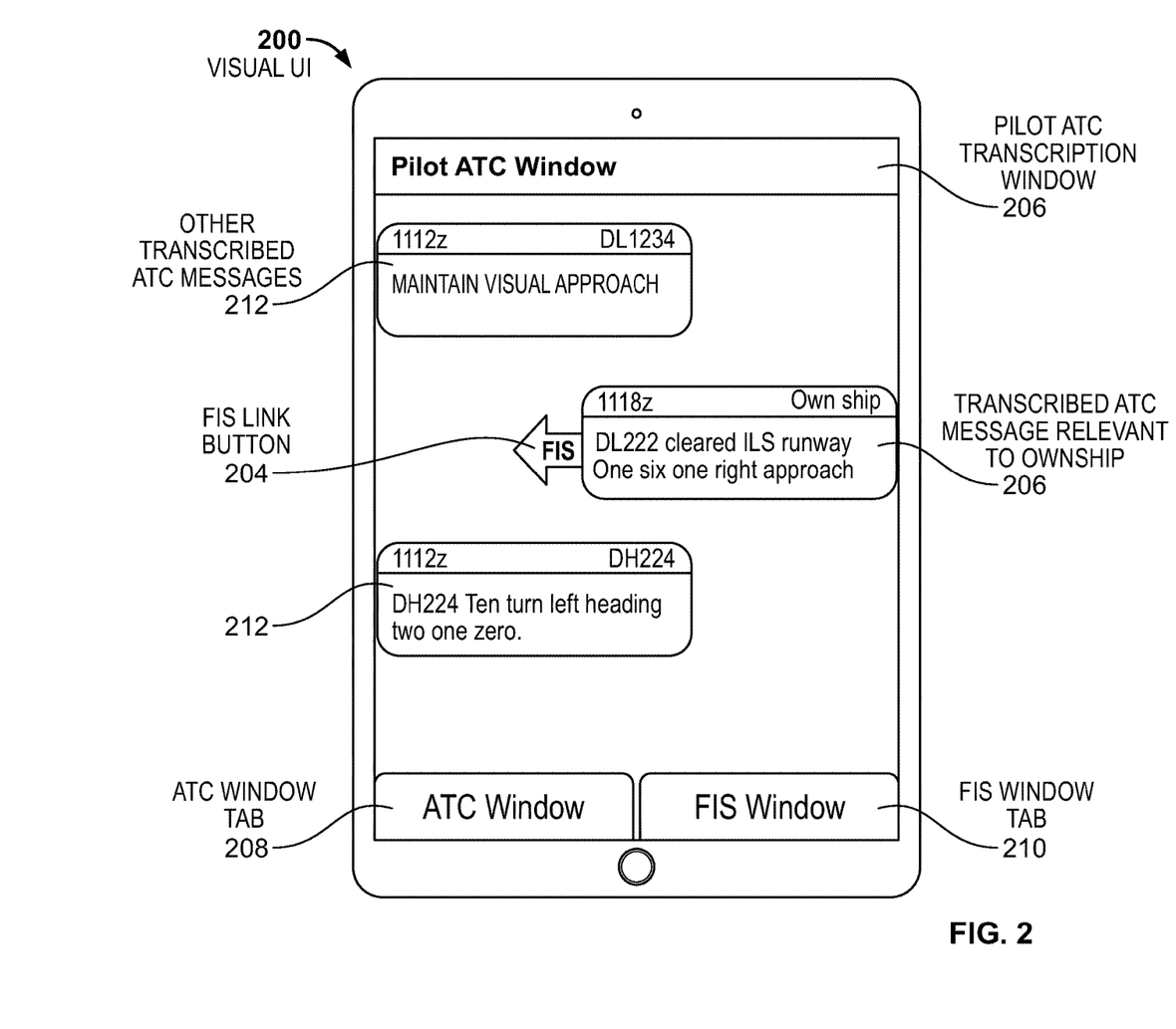
FIGS. 2 to 5 depict exemplary visual user interfaces, in accordance with exemplary embodiments.

An exemplary visual user interface (visual UI) 200 is illustrated in FIG. 2. The visual UI 200 includes a pilot ATC transcription window 206 that displays messages between ATC 114 and a member of the flight crew. The pilot ATC transcription window 206 displays transcribed ATC messages relevant to ownship 202 and other transcribed ATC messages 212 (e.g. related to other aircraft but transcribed based on voice communications over the ATC voice channel). The transcribed ATC messages relevant to ownship 202 are visually differentiated from the other transcribed ATC messages 212 in some way. In the present example, transcribed ATC messages relevant to ownship 202 are placed in a right side column and the other transcribed ATC messages 212 are placed in a left side column but an opposite orientation could be used and other differentiating forms could additionally, or alternatively, be implemented such as color coding. Whether ATC transcribed messages are relevant to the ownship can be determined by the aircraft identifier provided with each message. The pilot ATC transcription window 206 includes an ATC window tab 208 and an FIS window tab 210 that are selectable to toggle between the pilot ATC transcription window 206 and a pilot FIS transcription window 300 (see FIG. 3). The transcribed ATC message relevant to ownship 202 is analyzed by the analyzer 104 with respect to transcribed FIS broadcast reports 130 to determine whether there is any data in the transcribed FIS broadcast reports 130 relevant to the transcribed ATC message relevant to ownship 202. Thus, data can be extracted from the transcribed ATC message relevant to ownship 202 to use for searching through the FIS broadcast reports 130 to find relevant parts. The transcribed FIS broadcast reports 130 may also, or alternatively, be analyzed with respect to other contextual information including aircraft state data 126 and flight plan data 128 to determine relevant parts of the transcribed FIS broadcast reports 130. When a link is found between the transcribed ATC message relevant to ownship 202 and a part of the transcribed FIST broadcast reports, an FIS link button 204 is placed adjacent the transcribed ATC message relevant to ownship 202 that can be selected by a user to switch to the pilot FIS transcription window 300 to display the relevant part of the transcribed FIS broadcast report 130, as shown in FIG. 3.

Figure 3:
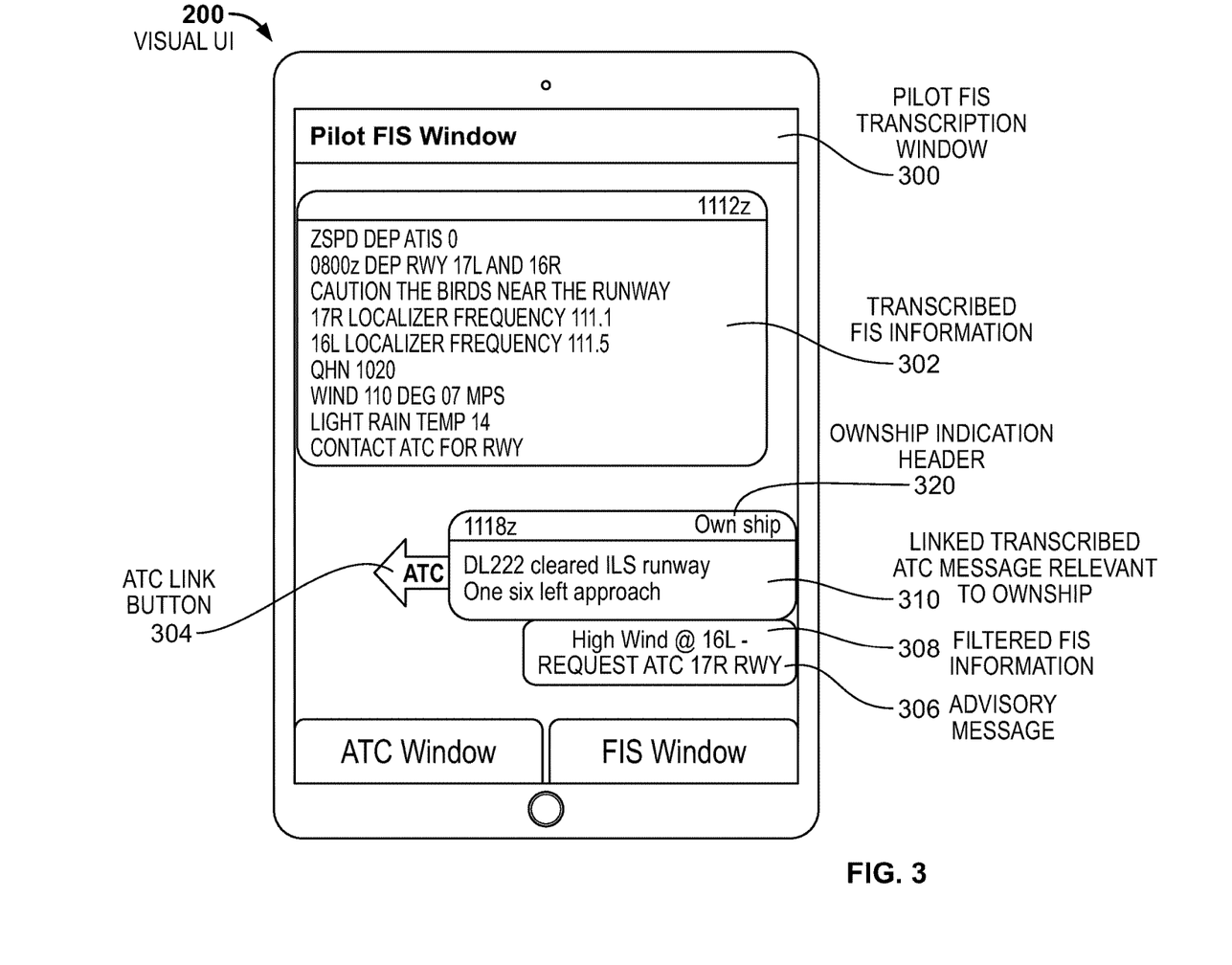

According to FIG. 3, the visual UI 200 is depicted including the pilot FIS transcription window 300. The pilot FIS transcription window 300 includes transcribed FIS information 302 based on the transcribed ATC broadcast message 154. Some of the transcribed FIS information 302 is relevant to the ownship aircraft 10 in terms of aircraft state, flight plan trajectory, planned approach path, destination runway and/or transcribed ATC messages and some of the FIS information 302 is not relevant in those terms. The analyzer 104 uses the aircraft state, flight plan trajectory, planned approach path, destination runway and/or transcribed ATC messages to pick out relevant parts of the transcribed FIS information 302 and to display that part in a visually differentiated manner from the transcribed FIS information 302. In the present embodiment, the filtered FIS information 308 is depicted in a separate text bubble from the longer transcribed FIS information 302 and is displayed in a different column. Further, an ownship indication header 320 is included in the separate text bubble. However, just some of these visual differentiation techniques may be used and color coding may additionally, or alternately, be used. In the present exemplary embodiment, the filtered FIS information 308 has been extracted based on a linked transcribed ATC message relevant to ownship 310. In such a case, the linked transcribed ATC message relevant to ownship 310 is tagged to the filtered FIS information 308. Further, an ATC link button 304 is provided adjacent to the linked transcribed ATC message relevant to ownship 310, which can be selected to toggle back to the transcribed ATC message relevant to ownship 202 in the pilot ATC window. Furthermore, the advisory builder 106 has performed its analysis on the filtered FIS information 308 (and possibly other context data such as the linked transcribed ATC message relevant to ownship 310) and has determined upon a recommendation to ATC 114 to change some part of the current flight plan. This recommendation is included in an advisory message 306 that is pinned to the filtered FIS information 308, the linked transcribed ATC message relevant to ownship 310 and the ATC link button 304.

In a first exemplary use case, described with respect to FIGS. 2 and 3, the following FIS broadcast report 122 has been received (in the form of Automatic Terminal Information Service (ATIS) information), transcribed and displayed in the pilot FIS transcription window 300.

ZSPD DEP ATIS 0
0800z DEP RWY 17L AND 16R
CAUTION THE BIRDS NEAR THE RUNWAY
17R LOCALIZER FREQUENCY 111.1
16L LOCALIZER FREQUENCY 111.5
QNH 1020
WIND 110 DEG 07 MPS
LIGHT RAIN TEMP 14
CONTACT ATC FOR RWY

Per the transcribed ATC broadcast message 154, the ownship aircraft 10 is cleared for Approach Runway 16L. However, based on the transcribed FIS information 302 (which has been searched/analyzed using the clearance information in the transcribed ATC broadcast message 154), runway winds are not favorable for this airframe. The analyzer 104 identifies the runway cleared for the ownship aircraft 10 in the transcribed FIS information 302 and extracts the unfavorable wind part of the transcribed FIS information 302 since this is found to impact (adversely) the planned approach for the aircraft 10. The extracted/filtered FIS information 308 is pinned to the linked transcribed ATC message relevant to ownship 310 in the pilot FIS transcription window 300. Further, the advisory builder 106 determines upon a predictive advisory for the crew to request a different runway and even determines from the transcribed FIS information 302 (specifically from wind direction and from the external information of runway orientation) that runway 17R offers more favorable wind conditions. Accordingly, the advisory builder 106 not only recommends that the landing runway should be changed but also proposes which different runway should be proposed. A corresponding advisory message 306 is displayed in the pilot FIS transcription window 300 pinned to the filtered FIS information 308. Thus, due to analysis of unfavorable winds at runway 16L (or other adverse weather condition), the system 100 provides an advisory message 306 to the crew to request an alternate runway which could be more appropriate for the prevailing conditions. Further, an FIS link button 204, 304 is provided between the filtered FIS information 308 and the transcribed ATC message relevant to ownship 202, 310 to allow the pilot to easily toggle between the FIS and ATC messages.

Figure 4:
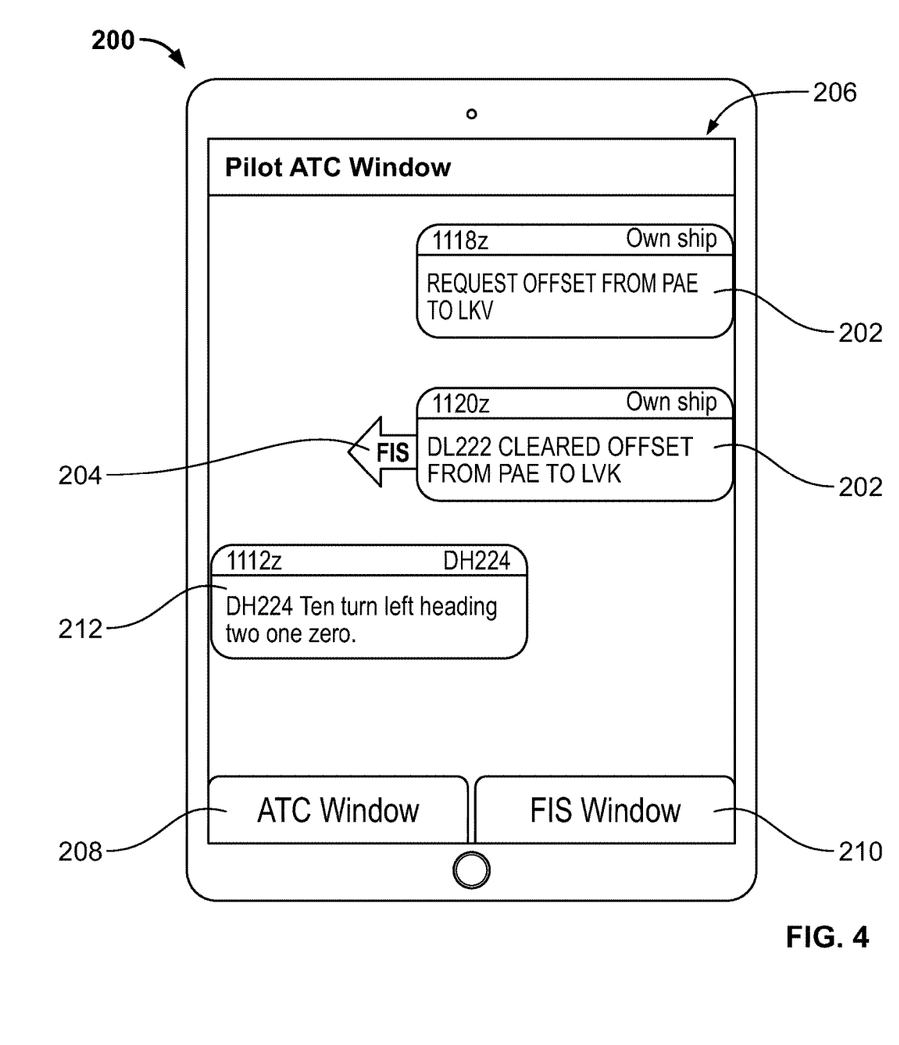
Figure 5:
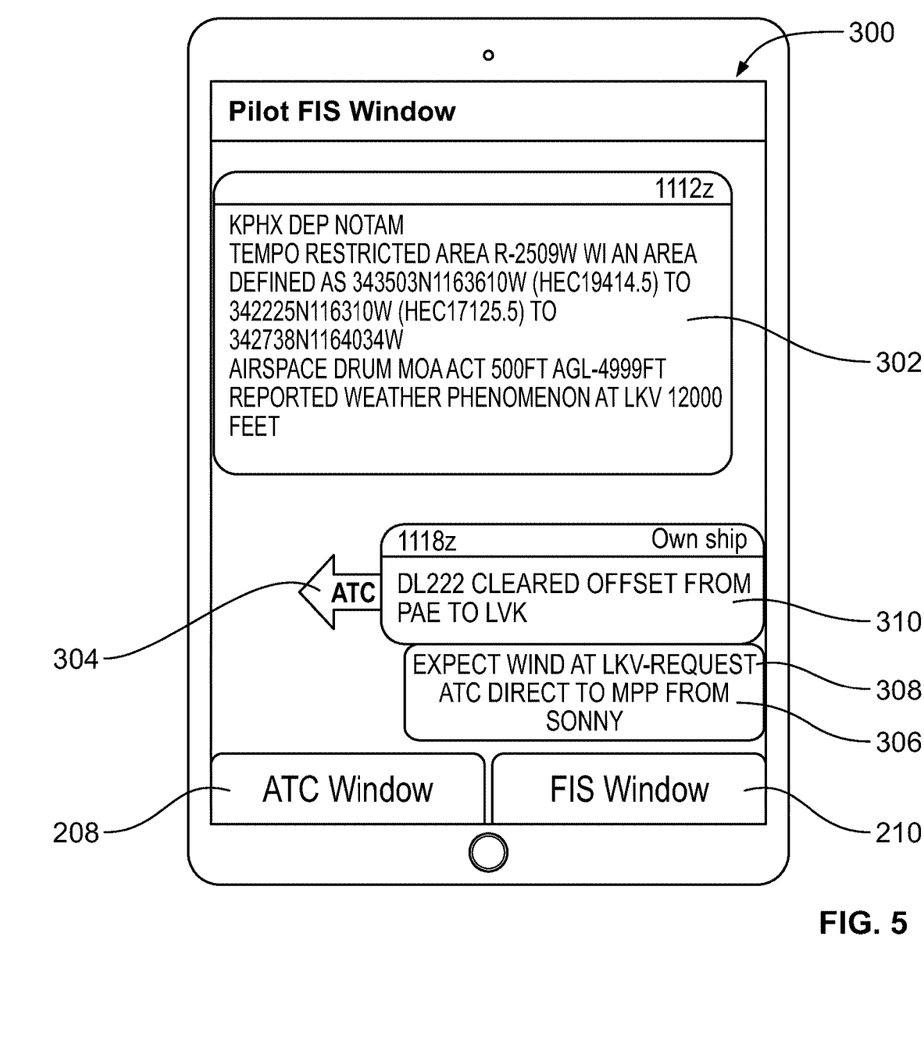

A second use case example is described with respect to the visual UI 200 of FIGS. 4 and 5. An FIS broadcast report 122 is received in the form of a Notice To AirMen (NOTAM). The voice to text transcription application 102 transcribes the NOTAM message and the display generator 108 displays corresponding transcribed FIS information 302 in the pilot FIS transcription window 300. Further, a transcribed ATC message relevant to ownship 202 is rendered in the pilot ATC transcription window 206 in the form of an ATC clearance message. Based on the ATC clearance message (and possible further context information on state of the aircraft and flight plan), the analyzer 104 and the advisory builder 106 evaluates the clearance message with respect to the transcribed FIS information 302 to generate and display filtered FIS information 308 and an advisory message 306 on the pilot FIS transcription window 300. In the specific, but non-limiting, embodiment of FIGS. 4 and 5, the transcribed FIS information 302 included information about weather distortion being reported at or near LKV waypoint, which is a waypoint though which the ownship aircraft 10 will pass according to the current ATC provided (or crew requested) transcribed ATC message relevant to ownship 202. That is, the analyzer 104 assess the transcribed ATC message relevant to ownship 202 with respect to the transcribed FIS information 302 to extract relevant weather conditions for the information indicating an ATC cleared approach path. Based on the filtered FIS information 308 relating to the adverse weather condition at a part of the cleared approach path, the advisory builder 106 can make a suggestion to avoid the adverse weather part of the cleared approach path in the form of a recommendation to direct to a different waypoint. The suggestion is output as part of an advisory message 306 included in the pilot FIS transcription window 300. Thus, the system 100 provides an advisory in terms of avoiding a segment having an adverse weather condition by proposing a new clearance request, which can be submitted to, and negotiated with, the ATC 114. According to the specific exemplary details of FIGS. 4 and 5, a crew member has requested a DIRECT TO from PAE to LVK and ATC 114 has cleared this request. However, in a down path segment, there is some weather distortion reported as part of the transcribed FIS information 302, which is identified by the analyzer 104 with respect to the clearance message (transcribed ATC message relevant to ownship 202), and the advisory builder 106 provides an advisory message 306 recommending to change the last segment to an alternate waypoint to avoid the weather distortion (DIRECT TO MPP FROM SUNNY).

Figure 6:
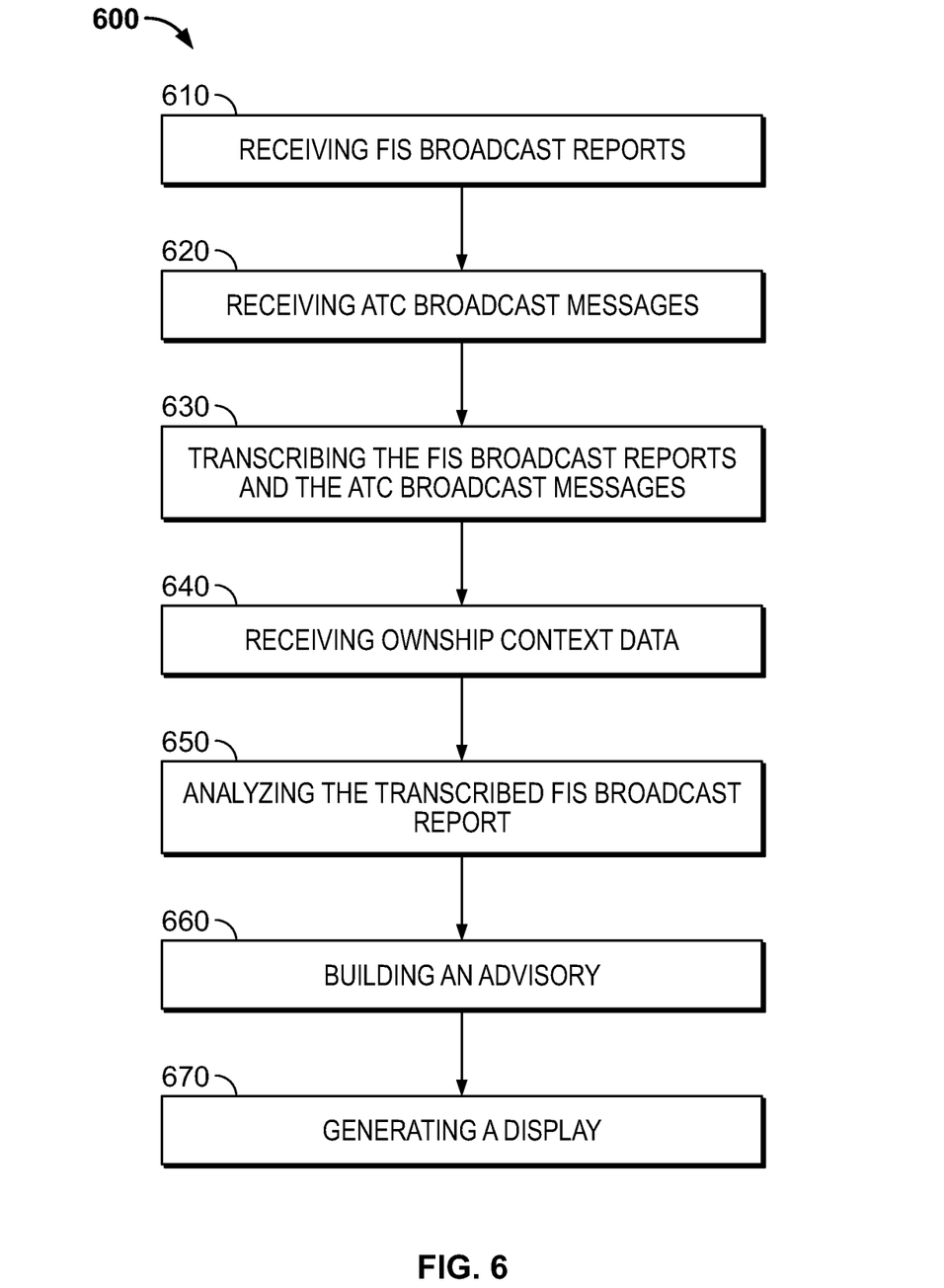
FIG. 6 is a flowchart of a method for transcribing and analyzing broadcast communications, in accordance with an embodiment.

A flow chart of an exemplary method 600 of transcribing and analyzing broadcast communications is provided in FIG. 6. The method 600 is computer implemented by the processing system 506 of FIG. 7, specifically by the various modules of the system 100 of FIG. 1 that are executed by the processing system 506 of FIG. 7.

The method 600 includes step 610 of receiving FIS broadcast reports 122 and step 620 of receiving ATC broadcast messages 124. The FIS broadcast reports 122 and ATC broadcast messages 124 are received by the processing system 506 described with reference to FIG. 7 below. The FIS broadcast reports 122 and ATC broadcast messages 124 are received over different radio channels. The FIS broadcast reports 122 and ATC broadcast messages 124 are provided to the voice to text transcription application 102 to perform machine implemented transcription in step 630. In step 640, ownship context data is received by the processing system 506, which may include the aircraft state data 126 and the flight plan data 128.

In step 650, the transcribed FIS broadcast reports 130 are analyzed with respect to one or more of the ownship context data from step 640 and the transcribed ATC broadcast message 154 from step 630. The transcribed ATC broadcast message 154 may include information on approach or landing clearance from ATC 114, which can be used to look up associated FIS information in the transcribed FIS broadcast report 130 for that approach or landing. The analyzer 104 can thus extract filtered FIS information 132 relevant to the transcribed ATC broadcast message 154 and/or the ownship context data from step 640. In step 650, the filtered FIS information 132 can be linked to the transcribed ATC broadcast message 154 from which the filtered FIS information 132 was generated. In step 660, an advisory is built based on the filtered FIS information 132 and the linked transcribed ATC broadcast message 154 by recommending an ATC request that could be submitted to avoid or alleviate an adverse condition indicated by the filtered FIS information 132. For example, when the ATC broadcast message indicates that the cleared approach path or landing target is subject to some adverse condition (e.g. weather), the advisory builder 106 may propose a diversion or alternate target that will not be subject to the adverse condition (or not as severely subject to the adverse condition).

In step 670, a display is generated in the form of a visual UI 200. The visual UI can include a pilot FIS transcription window 300 detailing the transcribed FIS broadcast reports 130 and a pilot ATC transcription window 206 detailing the transcribed ATC broadcast messages 154. The pilot FIS transcription window 300 or the pilot ATC transcription window 206 may further detail the filtered FIS information 132, which may be pinned to the advisory message from step 660 and which may also be pinned to any linked transcribed ATC broadcast message 154.

Figure 7:
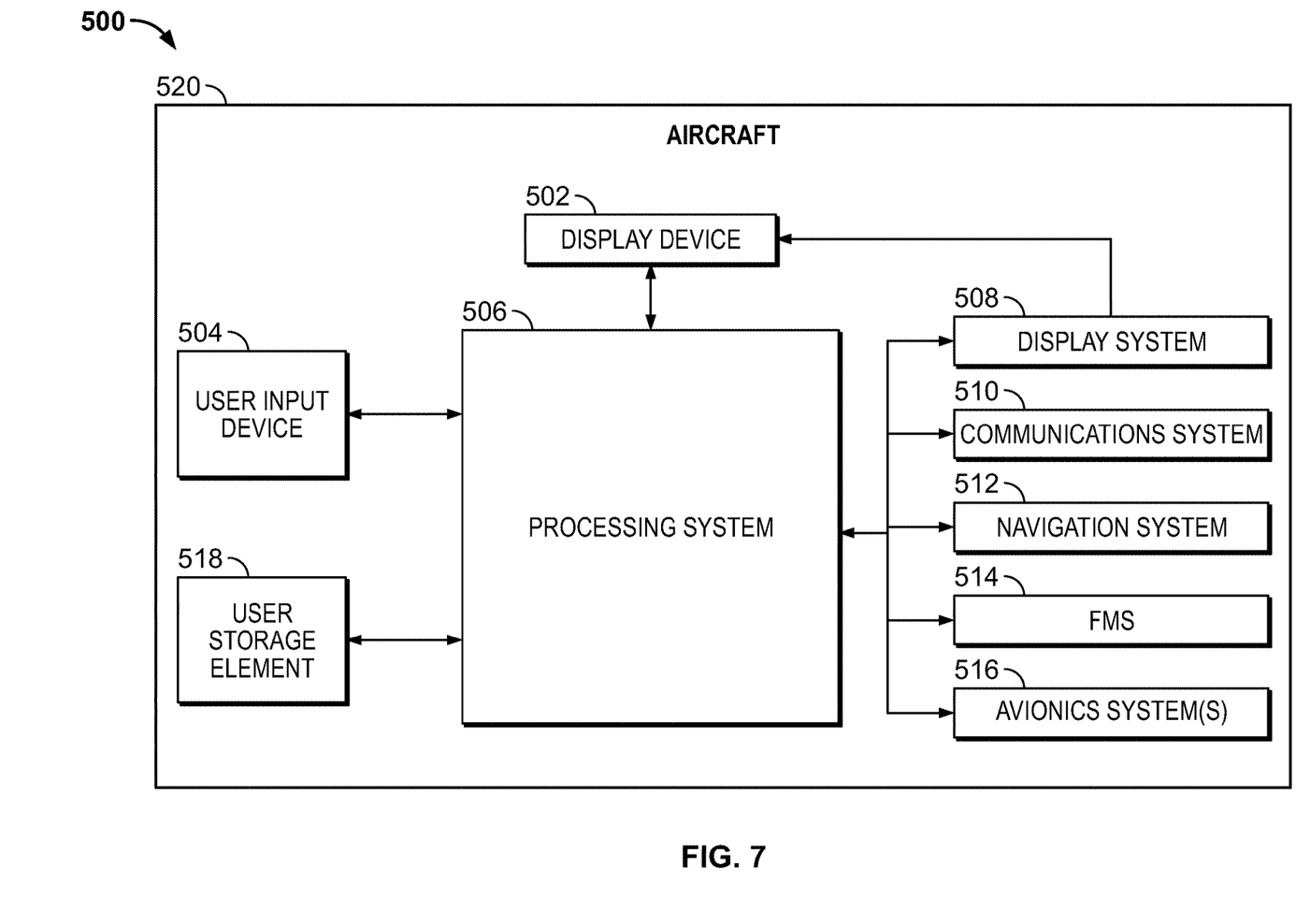
FIG. 7 depicts an exemplary embodiment of an aircraft system suitable for implementing the systems and methods for transcribing and analyzing broadcast communications, in accordance with one or more embodiments.

FIG. 7 depicts an exemplary embodiment of an aircraft system 500 suitable for implementing the descent below alerts described herein. The illustrated aircraft system 500 (corresponding to system 100 of FIG. 1) includes, without limitation, a display device 502 (corresponding to display device 110 of FIG. 1), one or more user input devices 504, a processing system 506 (for implementing functions and methods described herein with respect to system 100), a communications system 510, a navigation system 512, a flight management system (FMS) 514 (corresponding to the FMS 118 of FIG. 1), one or more avionics systems 516, and a data storage element 518 (suitably configured to support operation of the system 500).

In exemplary embodiments, the display device 502 is realized as an electronic display capable of graphically displaying flight information or other data associated with operation of the aircraft 520 under control of the display system 508 and/or processing system 506. In this regard, the display device 502 is coupled to the display system 508 and the processing system 506, wherein the processing system 506 and the display system 508 are cooperatively configured to display, render, or otherwise convey one or more graphical representations or images associated with operation of the aircraft 520 on the display device 502. The user input device 504 is coupled to the processing system 506, and the user input device 504 and the processing system 506 are cooperatively configured to allow a user (e.g., a pilot, co-pilot, or crew member) to interact with the display device 502 and/or other elements of the system 500, as described herein. Depending on the embodiment, the user input device(s) 504 may be realized as a keypad, touchpad, keyboard, mouse, touch panel (or touchscreen), joystick, knob, line select key or another suitable device adapted to receive input from a user. In some embodiments, the user input device 504 includes or is realized as an audio input device, such as a microphone, audio transducer, audio sensor, or the like, that is adapted to allow a user to provide audio input to the system 500 in a "hands free" manner without requiring the user to move his or her hands, eyes and/or head to interact with the system 500.

The processing system 506 generally represents the hardware, software, and/or firmware components configured to facilitate communications and/or interaction between the elements of the aircraft system 500 and perform additional tasks and/or functions to support the system 100 of FIG. 1 during operation of the aircraft system 500, as described herein. Depending on the embodiment, the processing system 506 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 506 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 506 includes processing logic that may be configured to carry out the functions, techniques, and processing tasks associated with the operation of the aircraft system 500, as described herein. Furthermore, the steps of a method or algorithm described in connection with the embodiments disclosed herein may be embodied directly in hardware, in firmware, in a software module executed by the processing system 506, or in any practical combination thereof. For example, in one or more embodiments, the processing system 506 includes or otherwise accesses a data storage element 518 (or memory), which may be realized as any sort of non-transitory short- or long-term storage media capable of storing programming instructions for execution by the processing system 506. The code or other computer-executable programming instructions, when read and executed by the processing system 506, cause the processing system 506 to support or otherwise perform certain tasks, operations, and/or functions described herein in the context of the flight rules alerts. Depending on the embodiment, the data storage element 518 may be physically realized using RAM memory, ROM memory, flash memory, registers, a hard disk, or another suitable data storage medium known in the art or any suitable combination thereof.

The display system 508 generally represents the hardware, software, and/or firmware components configured to control the display and/or rendering of one or more navigational maps and/or other displays pertaining to operation of the aircraft 520 and/or onboard systems 510, 512, 514, 516 on the display device 502. In this regard, the display system 508 may access or include one or more databases suitably configured to support operations of the display system 508, such as, for example, a terrain database, an obstacle database, a navigational database, a geopolitical database, a terminal airspace database, a special use airspace database, or other information for rendering and/or displaying navigational maps and/or other content on the display device 502.

Still referring to FIG. 7, in an exemplary embodiment, the processing system 506 is coupled to the navigation system 512, which is configured to provide real-time navigational data and/or information regarding operation of the aircraft 520. The navigation system 512 may be realized as a global navigation satellite system (e.g., a global positioning system (GPS), a ground-based augmentation system (GBAS), a satellite-based augmentation system (SBAS), and/or the like), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 512, as will be appreciated in the art. The navigation system 512 is capable of obtaining and/or determining the instantaneous position of the aircraft 520, that is, the current (or instantaneous) location of the aircraft 520 (e.g., the current latitude and longitude) and the current (or instantaneous) altitude or above ground level for the aircraft 520. The navigation system 512 is also capable of obtaining or otherwise determining the heading of the aircraft 520 (i.e., the direction the aircraft is traveling in relative to some reference). In the illustrated embodiment, the processing system 506 is also coupled to the communications system 510, which is configured to support communications to and/or from the aircraft 520. For example, the communications system 510 may support communications between the aircraft 520 and air traffic control or another suitable command center or ground location. In this regard, the communications system 510 may be realized using a radio communication system and/or another suitable data link system.

In an exemplary embodiment, the processing system 506 is also coupled to the FMS 514, which is coupled to the navigation system 512, the communications system 510, and one or more additional avionics systems 516 to support navigation, flight planning, and other aircraft control functions in a conventional manner, as well as to provide real-time data and/or information regarding the operational status of the aircraft 520 to the processing system 506. Although FIG. 7 depicts a single avionics system 516, in practice, the aircraft system 500 and/or aircraft 520 will likely include numerous avionics systems for obtaining and/or providing real-time flight-related information that may be displayed on the display device 502 or otherwise provided to a user (e.g., a pilot, a co-pilot, or crew member). For example, practical embodiments of the aircraft system 500 and/or aircraft 520 will likely include one or more of the following avionics systems suitably configured to support operation of the aircraft 520: a weather system, an air traffic management system, a radar system, a traffic avoidance system, an autopilot system, an autothrust system, a flight control system, hydraulics systems, pneumatics systems, environmental systems, aircraft systems, engine systems, trim systems, lighting systems, crew alerting systems, electronic checklist systems, an electronic flight bag and/or another suitable avionics system. In various embodiments, the processing system 506 may obtain information pertaining to the current location and/or altitude of the aircraft 520 and/or other operational information characterizing or otherwise describing the current operational context or status of the aircraft 520 from one or more of the onboard systems 508, 510, 512, 514, 516.

It should be understood that FIG. 7 is a simplified representation of the aircraft system 500 for purposes of explanation and ease of description, and FIG. 7 is not intended to limit the application or scope of the subject matter described herein in any way. It should be appreciated that although FIG. 7 shows the various elements of the system 500 being located onboard the aircraft 520 (e.g., in the cockpit), in practice, one or more of the elements of the system 500 may be located outside the aircraft 520 (e.g., on the ground as part of an air traffic control center or another command center) and communicatively coupled to the remaining elements of the aircraft system 500 (e.g., via a data link and/or communications system 510). For example, in some embodiments, the data storage element 518 may be located outside the aircraft 520 and communicatively coupled to the processing system 506 via a data link and/or communications system 510. Furthermore, practical embodiments of the aircraft system 500 and/or aircraft 520 will include numerous other devices and components for providing additional functions and features, as will be appreciated in the art. In this regard, it will be appreciated that although FIG. 7 shows a single display device 502, in practice, additional display devices may be present onboard the aircraft 520. Additionally, it should be noted that in other embodiments, features and/or functionality of processing system 506 described herein can be implemented by or otherwise integrated with the features and/or functionality provided by the FMS 514. In other words, some embodiments may integrate the processing system 506 with the FMS 514. In yet other embodiments, various aspects of the subject matter described herein may be implemented by or at an electronic flight bag (EFB) or similar electronic device that is communicatively coupled to the processing system 506 and/or the FMS 514.

For the sake of brevity, conventional techniques related to sensors, statistics, data analysis, avionics systems, redundancy, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for providing a visual user interface on a display device associated with an aircraft, the method comprising:
   receiving, via a receiving system of an aircraft, a Flight Information System (FIS) broadcast report;
   receiving, via the receiving system, an Air Traffic Control (ATC) broadcast message;
   transcribing, using a voice to text application, the FIS broadcast report and the ATC broadcast message;
   receiving, via a sensor system of the aircraft, aircraft state data;
   receiving, via a flight management system (FMS) of the aircraft, aircraft flight plan data;
   generating, via at least one processor onboard the aircraft, filtered FIS information from the FIS broadcast report based on the ATC broadcast message, the aircraft state data, and the aircraft flight plan data;
   identifying, via the at least one processor, at least a portion of the filtered FIS information as being based on the ATC broadcast message;

generating, via the at least one processor, link data between the at least the portion of the filtered FIS information and the ATC broadcast message; and rendering, via the at least one processor, a first visual user interface (UI) to be displayed on the display device, the first visual UI including the transcribed ATC broadcast message and a first functional link based on the link data, wherein selection of the first functional link generates a second visual UI to be displayed on the display device, the second visual UI including the transcribed FIS broadcast report with a second functional link based on the link data representing an association between the ATC broadcast message and the at least the portion of the filtered FIS information.

2. The method of claim 1, wherein the first visual UI includes the transcribed ATC broadcast message tagged to the at least the portion of the filtered FIS information.

3. The method of claim 1, wherein the display device is an Electronic Flight Bag (EFB) display device or other electronic device.

4. The method of claim 1, comprising determining, via the at least one processor, advisory data describing advice to alleviate an adverse condition included in the filtered FIS information, wherein an advisory message based on the advisory data is rendered as part of the second visual UI.

5. The method of claim 4, wherein the advisory message includes a prompt to submit a request to ATC associated with a change in a flight plan, the aircraft flight plan data comprising the flight plan.

6. The method of claim 5, wherein the change in the flight plan includes a change in destination runway or a change in approach path.

7. The method of claim 1, wherein the filtered FIS information includes weather conditions along a flight plan, the aircraft flight plan data comprising the flight plan.

8. The method of claim 7, comprising determining, via the at least one processor, advisory data describing advice to alleviate an adverse weather condition included in the filtered FIS information, wherein an advisory message based on the advisory data is rendered as part of the second visual UI.

9. The method of claim 8, comprising analyzing alternative flight path options with respect to the transcribed FIS information in determining the advisory data.

10. A system for providing a visual user interface on a display device associated with an aircraft, the system comprising:
  a sensor system of the aircraft;
  a flight management system (FMS) of the aircraft;
  a receiving system;
  a display device; and
  at least one processor in operable communication with the sensor system, the FMS, the receiving system and the display device, the at least one processor configured to execute program instructions, wherein the program instructions are configured to cause the at least one processor to:
    receive a Flight Information System (FIS) broadcast report and an Air Traffic Control (ATC) broadcast message via the receiving system;
    transcribe, using a voice to text application, the FIS broadcast report and the ATC broadcast message;
    receive aircraft state data from the sensor system;
    receive aircraft flight plan data from the FMS;
    generate filtered FIS information from the FIS broadcast report based on the ATC broadcast message, the aircraft state data, and the aircraft flight plan data;
    identify at least a portion of the filtered FIS information as being based on the ATC broadcast message;
    generate link data between the at least the portion of the filtered FIS information and the ATC broadcast message; and
    render a first visual user interface (UI) to be displayed on the display device, the first visual UI including the transcribed ATC broadcast message and a first functional link based on the link data, wherein selection of the first functional link generates a second visual UI to be displayed on the display device, the second visual UI including the transcribed FIS broadcast report with a second functional link based on the link data representing an association between the ATC broadcast message and the at least the portion of the filtered FIS information.

11. The system of claim 10, wherein the first visual UI includes the transcribed ATC broadcast message tagged to the at least the portion of the filtered FIS information.

12. The system of claim 10, wherein the display device is an Electronic Flight Bag (EFB) display device.

13. The system of claim 10, wherein the program instructions are configured to cause the at least one processor to: determine advisory data describing advice to alleviate an adverse condition included in the filtered FIS information, wherein an advisory message based on the advisory data is rendered as part of the second visual UI.

14. The system of claim 13, wherein the advisory message includes a prompt to submit a request to ATC associated with a change in a flight plan, the aircraft flight plan data comprising the flight plan.

15. The system of claim 14, wherein the change in the flight plan includes a change in destination runway or a change in approach path.

16. The system of claim 10, wherein the filtered FIS information includes weather conditions along a flight plan, the aircraft flight plan data comprising the flight plan.

17. The system of claim 16, wherein the program instructions are configured to cause the at least one processor to: determine advisory data describing advice to alleviate an adverse weather condition included in the filtered FIS information, wherein an advisory message based on the advisory data is rendered as part of the second visual UI.

18. The system of claim 17, wherein the at least one processor is configured to analyze alternative flight path options with respect to the transcribed FIS information in determining the advisory data.

* * * * *